United States Patent
Vrolijk

(10) Patent No.: US 10,808,859 B2
(45) Date of Patent: Oct. 20, 2020

(54) MODULATABLE SAFETY VALVE

(71) Applicant: ebm-papst Landshut GmbH, Landshut (DE)

(72) Inventor: Enno Jan Vrolijk, Dalen (NL)

(73) Assignee: emb-papst Landshut GmbH, Landshut (DE)

( * ) Notice: Subject to any disclaimer, the term of this patent is extended or adjusted under 35 U.S.C. 154(b) by 24 days.

(21) Appl. No.: 16/202,303

(22) Filed: Nov. 28, 2018

(65) Prior Publication Data

US 2019/0162326 A1 May 30, 2019

(30) Foreign Application Priority Data

Nov. 28, 2017 (DE) .......................... 10 2017 128 077

(51) Int. Cl.
*F16K 31/06* (2006.01)
*F16K 17/04* (2006.01)
*F16K 1/44* (2006.01)
*F16K 1/00* (2006.01)

(52) U.S. Cl.
CPC ............ *F16K 31/0655* (2013.01); *F16K 1/00* (2013.01); *F16K 1/443* (2013.01); *F16K 17/044* (2013.01); *F16K 17/0413* (2013.01); *Y10T 137/86445* (2015.04); *Y10T 137/88038* (2015.04)

(58) Field of Classification Search
CPC .... F16K 31/0655; F16K 17/044; F16K 1/443; F16K 17/0413; F16K 1/00
USPC ........................................ 137/624.18, 618.18
See application file for complete search history.

(56) References Cited

U.S. PATENT DOCUMENTS

| | | | | |
|---|---|---|---|---|
| 2,392,741 A | * | 1/1946 | Hurlburt ............... | F16K 31/408 137/630.22 |
| 3,963,049 A | * | 6/1976 | Beauregard ............. | F16K 25/00 137/614.18 |
| 6,047,718 A | * | 4/2000 | Konsky ................... | F16K 1/443 137/1 |
| 7,011,110 B1 | | 3/2006 | Stark | |
| 7,367,543 B2 | * | 5/2008 | Sisk ..................... | F16K 31/0655 251/129.19 |
| 7,828,265 B2 | * | 11/2010 | Sisk ..................... | F16K 31/0655 251/129.19 |
| 8,813,776 B2 | * | 8/2014 | Stark .................. | G05D 16/2013 137/487.5 |
| 9,683,674 B2 | * | 6/2017 | Super ........................ | F16K 7/12 |

FOREIGN PATENT DOCUMENTS

WO   WO-2012/115740 A2   8/2012

* cited by examiner

*Primary Examiner* — Umashankar Venkatesan
(74) *Attorney, Agent, or Firm* — Harness, Dickey & Pierce, P.L.C.

(57) ABSTRACT

A safety valve (1) has a first valve, and a second valve, a magnetic armature (3) moved by voltage applied to a coil (2). Movement of the armature (3) acts against a spring force of the first valve spring (5) and loosens the first valve body (4) from the first valve seat (6). The movement of the armature (3) subsequently acts against a spring force of the second valve spring (8) and loosens the second valve body (7) from the second valve seat (9). This frees a valve opening for a flowthrough of the gas flow. The flowthrough amount of the gas flow through the valve opening can be continuously controlled as a function of the voltage applied to the coil (2) between a closed position and a fully open position even in partially open positions.

12 Claims, 2 Drawing Sheets

MODULATABLE SAFETY VALVE

CROSS-REFERENCE TO RELATED APPLICATION

This application claims priority to German Application No. 10 2017 128 077.4, filed Nov. 28, 2017. The disclosure of the above application is incorporated herein by reference.

FIELD

The disclosure relates to a modulatable safety valve for controlling a gas flow and, more particularly, to a valve used in a gas-air compound system of combustion systems.

BACKGROUND

Safety valves, in addition to gas regulating valves, are constructed in such a manner that they automatically close in case of a breach, e.g., in case of a power outage and securely close off the gas supply. Usually to control the safety valve, a voltage is applied to a coil that moves an armature after a certain voltage value. At the same time, it loosens the valve body from the valve seat and suddenly moves it into the fully open position. As soon as the current or the voltage is gone, the valve body is pressed by a valve spring back onto the valve seat. Double safety valves are also known with two integrated, redundantly provided valves. They include, independently from one another, a valve body that, in the case of a breach strike their own valve seats so that both valves close independently of one another.

The known safety valves serve exclusively to ensure safety and are constructed as OPEN-CLOSED valves. Thus, their valve opening is either fully open or fully closed. The same applies in a corresponding manner to the double safety valves. Here, both redundantly provided valves are also fully open or fully closed. The realizing of partially open positions is not provided since this takes place via separate, series-connected gas regulating valves. The disclosure is therefore based on the problem of making a modulatable safety valve available.

SUMMARY

According to the disclosure, a safety valve for controlling a gas flow is constructed as a double safety valve with a magnetic armature that can be moved by a voltage applied to a coil. It Includes a first valve with a first valve body, a first valve spring, and a first valve seat. A second valve with a second valve body, a second valve spring and a second valve seat is included. A movement of the armature acts from a closed position of the safety valve at first against a spring force of the first valve spring. This loosens the first valve body from the first valve seat. The movement of the armature subsequently acts against a spring force of the second valve body. This loosens the second valve from the second valve seat. Therefore, this frees a valve opening for a flowthrough of the gas flow. A spring constant of the second valve spring is greater than a spring constant of the first valve spring. Thus, a flowthrough amount of the gas flow through the valve opening can be continuously controlled as a function of the voltage applied to the coil between a closed position and a fully open position even in partially open positions.

The spring rate (also designated as "spring stiffness") of the second valve spring is set to be higher, opposite the spring rate of the first valve spring, in such a manner that continuously changeable open positions of the second valve and therefore of the safety valve can be controlled. In particular, the spring rate of the second valve spring exceeds the spring rate of the first valve spring at least by a factor of 5.

Upon an elevation of the voltage on the coil, the magnetic force on the armature is raised and therefore also the pre-tensioning force of the first valve spring of the first valve. As soon as the magnetic force, after a first critical voltage value, exceeds the first spring force, the first valve body separates fully and suddenly from the first valve seat. This puts the first valve in a fully open position.

However, the second valve still remains closed, due to the higher spring rate of the second valve spring, at this first critical voltage value and the associated magnetic force. The second valve spring includes a spring constant according to the disclosure that is designed so that the second valve body is loosened from the second valve seat only after the exceeding of the first critical voltage value and an open position of the second valve body. Therefore, the second valve can be controlled by the voltage applied to the coil. The first valve is furthermore fully open at the same time.

The control of the flowthrough of the gas flow through the valve opening of the safety valve takes place exclusively via a lifting of the second valve body and as a function of the voltage applied to the coil.

In an embodiment of the safety valve, the first valve body is arranged directly on the armature.

In another embodiment of the safety valve, the armature is surrounded at least in sections by a magnetic or non-magnetic casing where the second valve body is arranged. The magnetic armature is movably arranged inside the casing. When the voltage is applied to or above the first critical voltage value, the armature moves inside the casing in an axial direction and acts against the first valve spring that is also arranged inside the casing.

In an advantageous embodiment, the first valve spring and the second valve spring are engaged with the casing. The second valve spring is preferably arranged, separated from the first valve spring, surrounding the casing. The movement of the armature can be transferred onto the casing and therefore acts, via the casing, directly on the second valve spring. The second valve body is advantageously also arranged or constructed on the casing.

In the safety valve, as a solution that optimizes the construction space, the first valve and the second valve are coaxially arranged. In addition, it is advantageous to design the safety valve as a replaceable modular unit. Such a modular unit is distinguished by a compact construction as a single unit that can be used independently of other components. For example, a modular unit can be set in a gas path where additional regulating valves are also constructed.

Furthermore, the disclosure includes a method for the modulating control of the above-described safety valve. A voltage, with a first critical voltage value, is applied to the coil which, in turn, moves the armature. As a result, the first valve opens. The voltage is subsequently controlled in a range above the first critical voltage value. The control of the voltage above the first critical voltage value determines an open position of the second valve between the closed position and the fully open position even in partially open positions. Thus, it also determines the flowthrough amount of the gas flow through the valve opening of the safety valve.

The method includes the first valve suddenly and fully opening at the first critical voltage valve applied to the coil. As described above, the second valve still remains closed at this first critical voltage value due to the higher spring rate of the second valve spring compared to the first valve spring and only opens at a higher voltage value. The regulating of the voltage above the first critical voltage value takes place in an embodiment along at least one characteristic curve. The second valve body of the second valve can be moved continuously and as a function of the voltage applied to the coil. Thus, the flowthrough amount of the gas flow through the valve opening can be continuously controlled as a function of the voltage applied to the coil between the closed position and the fully open position even in any partially opened positions. As a result, the safety valve offers a regulating function as a regulating valve in addition to the safety function.

Furthermore, the method includes the second valve only opening when the first valve is fully open. Therefore, the regulating of the flowthrough amount of the gas flow is exclusively realized and influenced by the second valve. The first valve constantly remains fully open and does not adversely affect the control.

Other advantageous developments of the disclosure are characterized in the dependent claims and represented in greater detail below together with the description of the preferred design of the disclosure in reference to the figures.

DRAWINGS

The drawings described herein are for illustrative purposes only of selected embodiments and not all possible implementations, and are not intended to limit the scope of the present disclosure.

DETAILED DESCRIPTION

Figure 1:
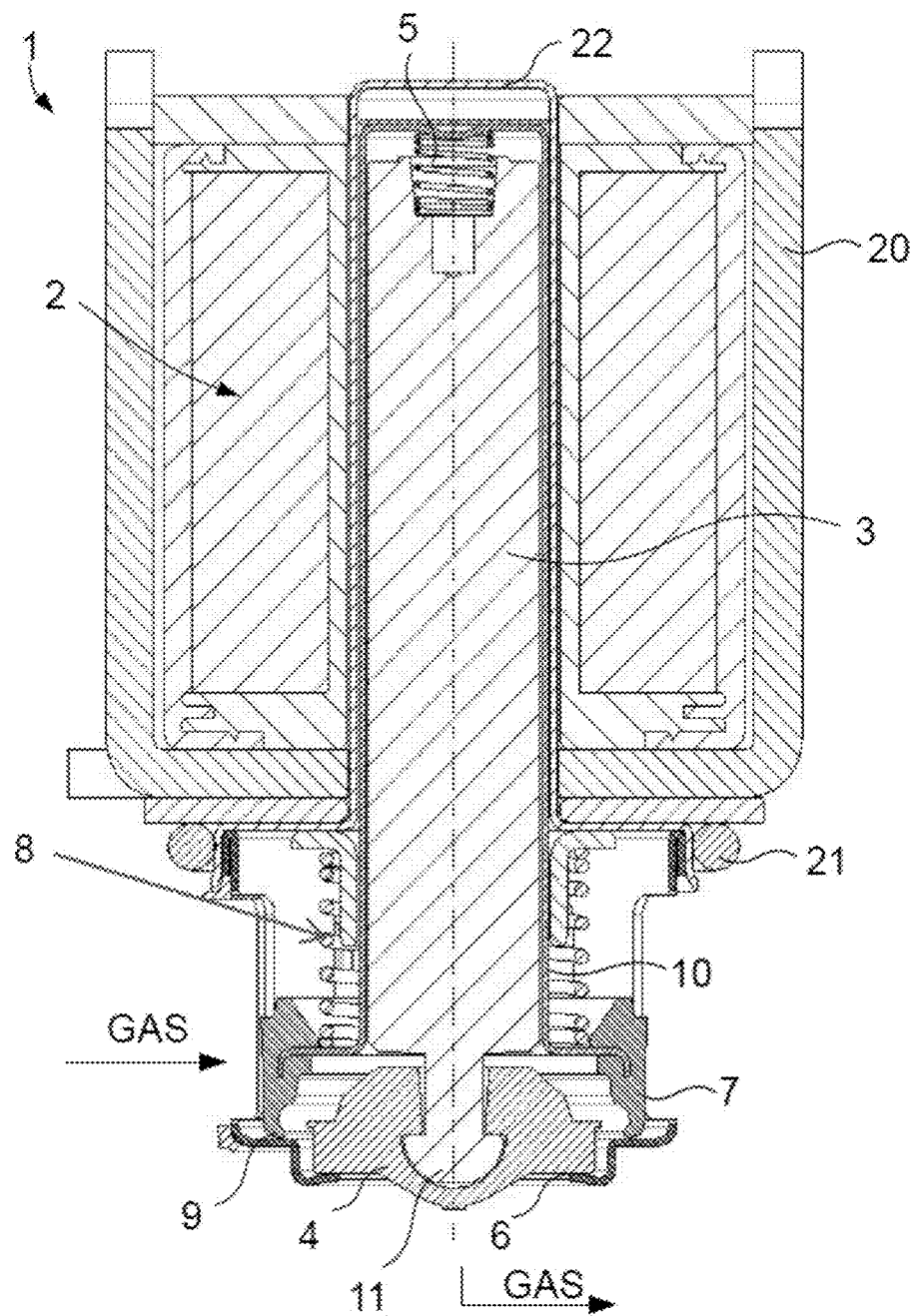
FIG. 1 shows a lateral sectional view of a safety valve.

FIG. 1 shows an exemplary embodiment of a safety valve 1 constructed as a modular unit. It illustrates a double safety valve with two valves arranged coaxially to one another in a lateral sectional view. The safety valve 1 is in the closed position and can be inserted and fastened, in the embodiment shown, in a gas path formed, for example, by a gas-air housing. The sealing takes place by the seal 21.

An electrical coil 2 is arranged inside a valve housing 20 that surrounds a magnetic armature 3 in its axially upper section. The armature 3 is received in a magnetic or non-magnetic casing 10 that is surrounded by a covering 22. The armature 3 projects in the axial direction out of the housing 20. The armature 3 includes a projection 11 on its axial end to receive the first valve body 4. The valve body 4 rests on the first valve seat 6 of the first valve. The first valve spring 5 is arranged between the armature 3 and the casing 10. The spring 5 exerts a permanent axial spring force, in the axial direction, on the armature 3 and thus on the first valve body 4.

The second valve is formed by the second valve body 7, fastened on the casing 10, by the second valve seat 9 and the second valve spring 8. The second valve spring 8 exerts a permanent axial spring force against the casing 10 and thus on the second valve body 7. The second valve spring 8 is supported indirectly on the housing 20.

When a voltage is applied to the coil 2, a magnetic force is generated in the axial direction on the armature 3. This counteracts the spring force of the first valve spring 5 and of the second valve spring 8. The spring constant of the second valve spring 8 is greater than the spring constant of the first valve spring 5. The armature 3 suddenly moves axially upward in the casing 10 after reaching a first critical voltage value and compresses the first valve spring 5. The armature 3 then rests axially on the front side on the casing 10. The first valve body 4 is released from the first valve seat 6 and the first valve is therefore fully open. The second valve spring 8 remains uncompressed during the first critical voltage value on account of the higher spring rate so that the second valve body 7 still lies on the second valve seat 9 and keeps the safety valve 1 closed. Upon an elevation of the voltage above the first critical voltage value the magnetic force on the armature 3 is elevated further. As a result, the armature 3 together with the casing 10 inside the covering 22, limiting the axial movement of the casing 10, is pressed axially upward in an axial direction and consequently compresses the second valve spring 8. Given a sufficiently high voltage value, the second valve body 7 begins to loosen from the second valve seat 9. As a result, the second valve and therefore the safety valve 1 is opened. As a result of the spring rate of the second valve spring 8, which is set to be sufficiently high, the spring is not suddenly compressed but rather it is compressed in a continuous manner as a function of the voltage value.

Therefore, the second valve, and with it the safety valve 1, can be continuously controlled by the voltage applied to the coil regarding the flowthrough amount of the gas flow through the valve opening between a closed position and a fully open position even in any partially open positions.

Since the opening of the second valve, i.e., the lifting of the second valve body 7 does not take place until above the first critical voltage value, the first valve remains constantly fully open at the time of the regulating of the second valve and does not influence the regulating. Upon a reduction of the voltage applied to the coil 2 at the first critical voltage value, the second valve continuously closes. Upon another reduction of the voltage, to a value below the first critical voltage value, the first valve additionally suddenly closes.

Figure 2:
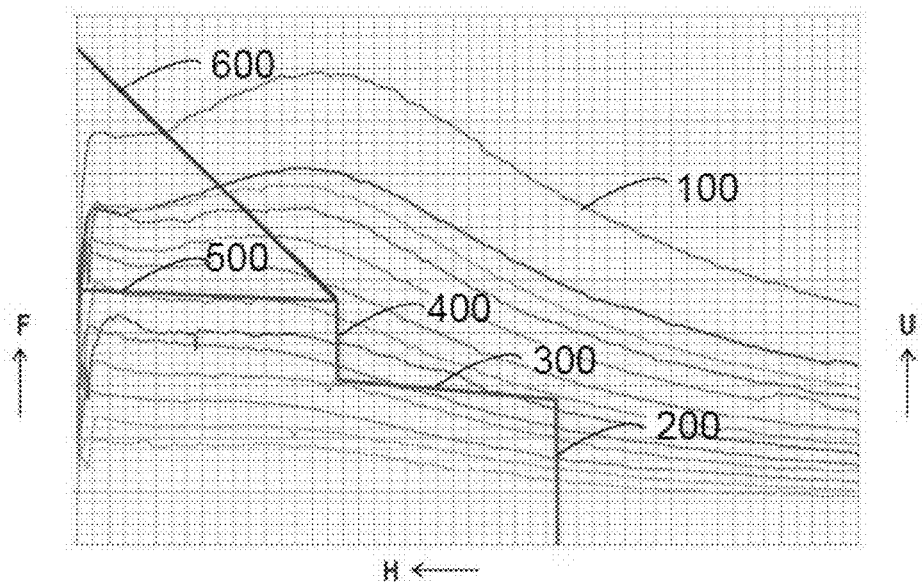
FIG. 2 shows a diagram with force path characteristic curves.

FIG. 2 shows a diagram with magnetic force path characteristic curves 100 at different voltages from which the rising lifting H of the first and of the second valve bodies 4, 7 results given a rising, applied voltage U and a magnetic force F on the armature 3 resulting from it. After having reached the first critical voltage value characterized by line 200, the armature 3 and the first valve body 4 suddenly move according to line 300 into the fully opened position while the voltage and the magnetic force remain substantially constant. Upon further elevation of the voltage according to line 400, the magnetic force on the armature 3 rises. The second valve body 7 begins to continuously rise at the end of line 400, line 600, and the second valve opens. The rise of the line 600 can be adjusted by the spring rate of the second valve spring 8. By way of comparison, line 500 also characterises a sudden opening of the second valve, which is not according to the disclosure and which corresponds to a non-controllable OPEN-CLOSED valve.

Figure 3:
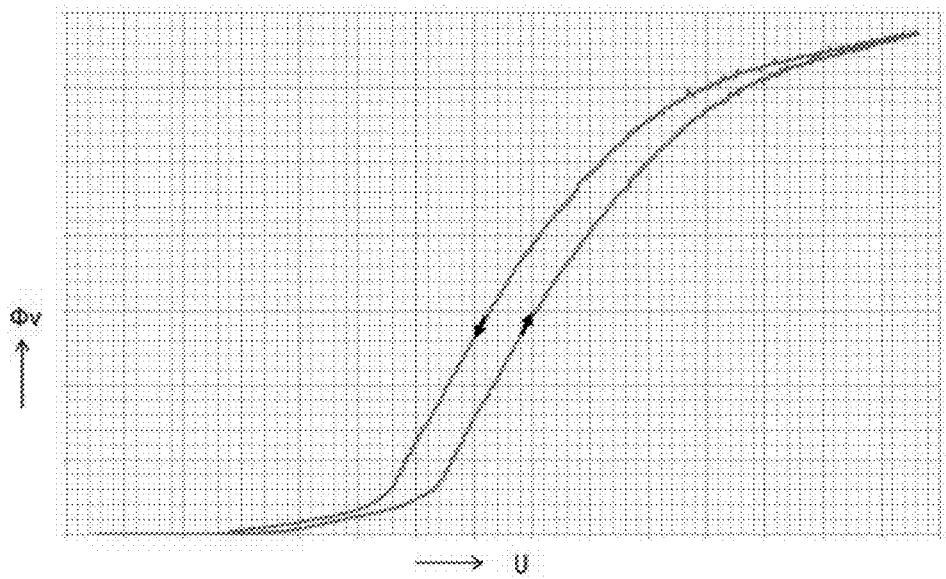
FIG. 3 shows a diagram with characteristic curves of the control of valve openings.

FIG. 3 shows a diagram with valve opening—control characteristic curves (modulation characteristic lines) at a gas input pressure of 20 mbar set by way of example. In contrast to OPEN-CLOSED valves, the volume flow V through the safety valve 1 can be continuously controlled as a function of the voltage U applied to the coil 2 along the characteristic curves. The characteristic curve on the right determines the opening and the characteristic curve on the left determines the closing of the second valve and therefore of the safety valve 1.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A safety valve for controlling a gas flow comprising:
   a double safety valve with a magnetic armature that moves by a voltage applied to a coil;
   a first valve with a first valve body, a first valve spring, and a first valve seat;
   a second valve with a second valve body, a second valve spring and a second valve seat;
   a movement of the armature acts from a closed position of the safety valve at first against a spring force of the first valve spring and loosens the first valve body from the first valve seat;
   the movement of the armature subsequently acts against a spring force of the second valve spring and loosens the second valve body from the second valve seat and therefore frees a valve opening for flowthrough of the gas;
   a spring constant of the second valve spring is greater than a spring constant of the first valve spring, and a flowthrough amount of the gas flow through the valve opening can be continuously controlled as a function of the voltage applied to the coil between a closed position and a fully open position, even in partially open positions; and
   the first valve spring has a spring constant designed in such a manner that the movement of the armature takes place after a first critical voltage value and moves the first valve body suddenly and fully from the first valve seat into a fully open positions;
   the second valve spring has a spring constant, designed such that the second valve body only comes loose from the second valve seat after exceeding the first critical voltage level, and an open position of the second valve body can be controlled by the voltage applied to the coil; and
   the control of the rate of the gas flow through the valve opening of the safety valve takes place exclusively by lifting the second valve body and as a function of the voltage applied to the coil.

2. The safety valve according to claim 1, wherein the first valve body is arranged directly on the armature.

3. The safety valve according to claim 1, wherein the armature is surrounded at least in sections by a casing where the second valve body is arranged.

4. The safety valve according to claim 3, wherein the casing is magnetic or non-magnetic.

5. The safety valve according to claim 3, wherein the first valve spring and the second valve spring engage with the casing.

6. The safety valve according to claim 1, wherein the first valve and the second valve are coaxially arranged.

7. The safety valve according to claim 1, wherein it is constructed as a replaceable module unit.

8. A method for modulating control of the safety valve according to claim 1 comprising:
   applying a voltage with a first critical voltage to the coil;
   moving the armature such that the first valve opens;
   subsequently controlling the voltage in an area above the first critical voltage, wherein controlling the voltage above the first critical voltage determines an open position of the second valve between the closed position and the fully open position, even in partially open positions, and determining the flowthrough amount of the gas flow through the valve opening of the safety valve.

9. The method according to claim 8, wherein the control of the rate of the gas flow through the valve opening of the safety valve takes place exclusively by a lifting of the second valve body and as a function of the voltage applied to the coil.

10. The method according to claim 8, wherein the first valve opens suddenly and fully at the first critical voltage applied to the coil.

11. The method according to claim 8, wherein the control of the voltage above the first critical voltage takes place along at least one characteristic curve.

12. The method according to claim 8, wherein the second valve only opens when the first valve is fully open.

* * * * *

UNITED STATES PATENT AND TRADEMARK OFFICE
CERTIFICATE OF CORRECTION

PATENT NO. : 10,808,859 B2  
APPLICATION NO. : 16/202303  
DATED : October 20, 2020  
INVENTOR(S) : Enno Jan Vrolijk Page 1 of 1

It is certified that error appears in the above-identified patent and that said Letters Patent is hereby corrected as shown below:

On the Title Page

Column 1, Assignee (73), Line 1      "emb-papst" should be --ebm-papst--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*